United States Patent
Kuze et al.

(10) Patent No.: US 6,868,607 B2
(45) Date of Patent: Mar. 22, 2005

(54) ELECTRIC POWER STEERING APPARATUS AND METHOD OF MANUFACTURING GEAR USED THEREFOR

(75) Inventors: Masashi Kuze, Kashiwara (JP); Mitsuharu Minami, Kashiwara (JP); Akihiko Shiina, Kashihara (JP); Hideo Matsubara, Nara (JP)

(73) Assignee: Koyo Seiko Co., Ltd., Osaka (JP)

( * ) Notice: Subject to any disclaimer, the term of this patent is extended or adjusted under 35 U.S.C. 154(b) by 49 days.

(21) Appl. No.: 10/625,601

(22) Filed: Jul. 24, 2003

(65) Prior Publication Data

US 2004/0083610 A1 May 6, 2004

Related U.S. Application Data

(62) Division of application No. 09/983,631, filed on Oct. 25, 2001, now Pat. No. 6,644,431.

(30) Foreign Application Priority Data

Nov. 16, 2000 (JP) ........................................ 2000-350235

(51) Int. Cl.[7] .............................. B21K 1/30; B23P 15/14
(52) U.S. Cl. ................................ 29/893.34; 29/893.33; 29/527.4
(58) Field of Search ........................... 29/893.3, 893.33, 29/893.34, 527.4; 180/443, 444; 74/443, 388 PS, DIG. 10, 439, 446, 425

(56) References Cited

U.S. PATENT DOCUMENTS

| | | | |
|---|---|---|---|
| 2,654,944 A | * 10/1953 | Wilson ..................... | 29/893.34 |
| 4,077,274 A | 3/1978 | Johnson | |
| 4,876,876 A | * 10/1989 | Ishida et al. .................. | 72/348 |
| 5,271,287 A | 12/1993 | Wadleigh | |
| 5,307,705 A | 5/1994 | Fenelon | |
| 5,497,548 A | 3/1996 | Schlenger et al. | |
| 5,706,694 A | * 1/1998 | Bhookmohan et al. ....... | 72/325 |
| 5,722,295 A | 3/1998 | Sakai et al. | |
| 5,906,135 A | 5/1999 | Prater | |
| 6,339,967 B1 | 1/2002 | Tanaka et al. | |
| 6,354,395 B1 | 3/2002 | Cheng et al. | |
| 6,394,220 B1 | 5/2002 | Kurokawa et al. | |
| 6,425,455 B1 | 7/2002 | Kurokawa et al. | |

FOREIGN PATENT DOCUMENTS

| | | |
|---|---|---|
| EP | 0 666 210 | 8/1995 |
| EP | 0 748 735 | 12/1996 |
| JP | 55135265 | 10/1980 |
| JP | 06-226385 | * 8/1994 |
| JP | 2001-206230 A | 7/2001 |

* cited by examiner

*Primary Examiner*—Eric Compton
(74) *Attorney, Agent, or Firm*—Birch, Stewart, Kolasch & Birch, LLP.

(57) ABSTRACT

The support body engaged with the interior side of the tooth body provided at the worm wheel of the electric power steering apparatus comprises: a corrugated cylinder part press-formed to have a plurality of concavities on the exterior side thereof and convexities to the interior formed by the concavities which are arranged in a peripheral direction; and a plate part an exterior edge of which is united with an end of the corrugated cylinder part, wherein the tooth body is engaged with the exterior side of the corrugated cylinder part. With the method of manufacturing the gear, synthetic resin of the tooth body can be deposited uniformly on the support body made of metal engaged with the interior of the tooth body, costs can be reduced, and the support body can be engaged with the tooth body without generating voids and weld marks.

4 Claims, 9 Drawing Sheets

ELECTRIC POWER STEERING APPARATUS AND METHOD OF MANUFACTURING GEAR USED THEREFOR

This application is a divisional of application Ser. No. 09/983,631, filed on Oct. 25, 2001, now U.S. Pat. No. 6,644,431, the entire contents of which are hereby incorporated by reference and for which priority is claimed under 35 U.S.C. § 120; and this application claims priority of Application No. 2000-350235 filed in Japan on Nov. 16, 2000 under 35 U.S.C. § 119.

BACKGROUND OF THE INVENTION

1. Field of the Invention

The present invention relates to an electric power steering apparatus using a motor as a generating source of steering assistance force and a method of manufacturing a gear used for the electric power steering apparatus.

2. Description of Related Art

An automobile is steered by transmitting rotating operation of a steering wheel disposed at the interior of passenger's room to a steering mechanism disposed at the exterior of the room for turning tire wheels for steering (front wheels, in general).

Figure 1:
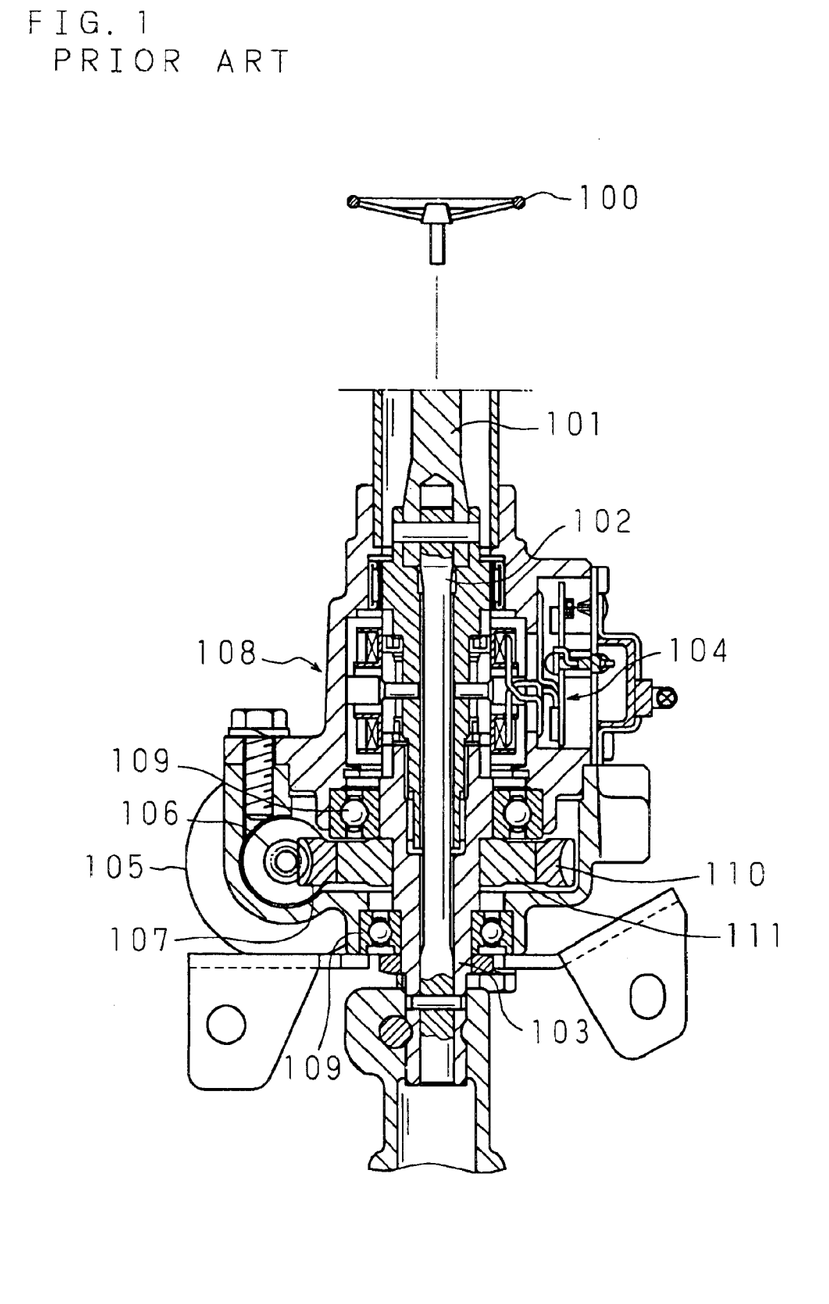
FIG. 1 is a cross-sectional view showing a constitution of a conventional electric power steering apparatus.

FIG. 1 is a cross-sectional view showing a constitution of a conventional electric power steering apparatus.

The figure shows an example of an electric power steering apparatus for an automobile, comprising: a first steering shaft 101 connected to a steering wheel 100 for steering; a second steering shaft 103 connected at one end thereof via a torsion bar 102 to said steering shaft 101 coaxially and at the other end thereof to a steering mechanism joined to tire wheels; a torque sensor 104 for detecting a torque applied on the first steering shaft 101 with rotation of the steering wheel 100 based on torsion generated on the torsion bar 102; a steering assist motor 105 to be driven based on the result of detection of said torque sensor 104; and a reduction mechanism joined to an output shaft of said motor 105 for reducing rotation of said output shaft and transmitting the reduced rotation to the second steering shaft 103. Said reduction mechanism has a worm 106 and a worm wheel 107. The electric power steering apparatus is constituted to lighten driver's load for steering by assisting the action of the steering mechanism corresponding to rotation of the steering wheel 100 with rotation of the motor 105.

The worm 106 constituting the reduction mechanism is supported at the interior of a housing 108 via a pair of antifriction bearings (not illustrated). The second steering shaft 103 provided with the worm wheel 107 is supported at the interior of the housing 108 via a pair of antifriction bearings 109, 109.

The worm wheel 107 comprises a ring-shaped tooth body 110 made of synthetic resin which has teeth meshing with the worm 106 and a support body 111 made of metal engaged with the interior side of said tooth body 110. The tooth body 110 made of synthetic resin reduces a jarring noise made by meshing with the worm 106 and realizes high workability of the teeth. A plurality of locking grooves 114 (see FIG. 2) are provided on a peripheral surface of the support body 111, and prevents relative rotation of the tooth body 110 and the support body 111.

Figure 2:
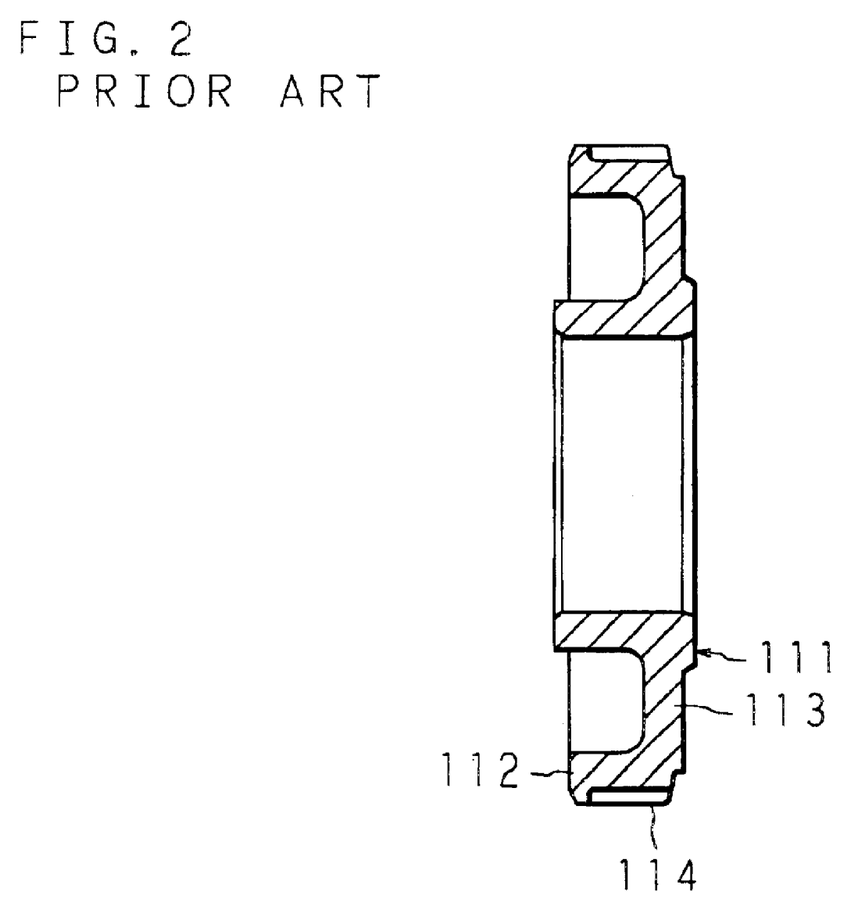
FIG. 2 is a cross-sectional view showing a constitution of a conventional support body of an electric power steering apparatus.

FIG. 2 is a cross-sectional view showing a constitution of a conventional support body. The support body 111 of the worm wheel 107 is formed through cut processing as in FIG. 1 or through cold forging as in FIG. 2. The support body 111 formed through cold forging comprises: a cylindrical part 112 engaged with the tooth body 110; a plate part 113 extended inward in a radial direction from one end of said cylindrical part 112; and the locking grooves 114 provided on the peripheral surface of the cylindrical part 112. The support body 111 is integrally united with the tooth body 110 by placing the support body 111 in a mold for injection molding and performing injection molding.

However, when the support body is formed through cut processing and cold forging, there arises a problem that unnecessary deposit cannot be removed enough. The support body with great weight enlarges inertial force at the time of steering, and causes a deterioration of feeling of steering. In addition, cut processing and cold forging were disadvantageous in comparison with press forming from the viewpoint of manufacturing costs.

The present applicant has applied an electric power steering apparatus a support body of which is press-formed (Japanese Patent Application Laid-Open No. 2001-206230).

The engagement part of the press-formed support body with the tooth body comprises a disc part having a plurality of through holes to be filled with synthetic resin for molding the tooth body which penetrate in an axial direction and a curved edge part provided with a plurality of locking grooves which is curved in an axial direction from an exterior edge of said disc part.

A remedy has been desired for solving the following problems of the press-formed support body. One problem is that the support body is complicated in structure since a relative slide of the tooth body and the support body is hindered at two positions which are the through holes and the curved edge of the engagement part. Another problem is that circularity of synthetic resin in the mold for injection molding at the time of molding the tooth body is low since the synthetic resin for molding the tooth body is filled into the through holes of the engagement part, which results in generation of voids and weld marks.

In order to simplify a structure of the engagement part of the press-formed support body, a support body without the through holes is conceivable. Such a support body should have a curved edge which is long in an axial direction provided with locking grooves on the peripheral surface thereof to ensure an enough contact area with the tooth body. However, manufacture of said support body requires use of a relatively expensive and large presser to perform plastic deformation exclusively on the locking groove part on the peripheral surface of the support body. Consequently an amortization expense of the presser is added to a unit price of the support body, and the unit price of the support body amounts to approximately the same as that of the support body provided with the through holes.

BRIEF SUMMARY OF THE INVENTION

The present invention has been made to settle the problematic points as described above. One object of the invention is to provide an electric power steering apparatus with which resin can be deposited uniformly, costs can be reduced, and a corrugated cylinder part can be engaged with a tooth body without generating voids and weld marks. Said electric power steering apparatus is constituted with the tooth body made of synthetic resin engaged with the exterior side of the corrugated cylinder part, said corrugated cylinder part being press-formed to deform the support body made of metal engaged with the interior side of said tooth body into a corrugated form corrugating in a peripheral direction.

Another object of the invention is to provide a method of manufacturing a gear with which a corrugated cylinder part with relatively long concavities can be provided simply by forming the relatively long concavities of the corrugated part with a relatively small presser. With said manufacturing method, the corrugated part configured as a corrugated plate is provided by performing press forming on a peripheral side of a metal plate circularly and the corrugated cylinder part is provided by bending said corrugated part into a cylindrical form with respect to a plate part. In the next place, the tooth body made of synthetic resin is integrally molded on the exterior side of said corrugated cylinder part.

The electric power steering apparatus according to the present invention is constituted to assist steering by transmitting rotation of a steering assist motor to a steering mechanism via a driving gear and a driven gear which has a ring-shaped tooth body made of synthetic resin meshing with said driving gear and a support body made of metal engaged with the interior side of said tooth body. The support body of the electric power steering apparatus comprises a corrugated cylinder part press-formed to have a plurality of concavities on the exterior side thereof and convexities to the interior side formed by said concavities which are arranged in a peripheral direction and a plate part an exterior edge of which is united with an end of said corrugated cylinder part.

With this constitution, unnecessary deposit on the support body can be removed satisfactorily in comparison with a conventional support body formed through cut processing and cold forging and resin can be deposited uniformly since the engagement side of the support body with the tooth body is configured as the press-formed corrugated cylinder part. In addition, the corrugated cylinder part which is relatively long in an axial direction and can ensure an enough contact area with the tooth body can be formed simply by press forming in comparison with the above-mentioned support body provided with the through holes and the curved edge part at the engagement part. Consequently manufacturing costs of the support body and the electric power steering apparatus using said support body can be reduced all the more. Further, synthetic resin for molding the tooth body can appropriately circulate along the concavities on the exterior side of the corrugated cylinder part since the corrugated cylinder part is engaged with the interior side of the tooth body, and the driven gear without voids and weld marks and the electric power steering apparatus using said driven gear are obtained.

The gear manufactured in the method according to the present invention is fitted to a transmitting shaft for transmitting rotation of the steering assist motor to the steering mechanism. With this manufacturing method, the outer peripheral side of the metal plate having the plate part to be mounted with a rotation transmitting system on a center side is press-formed circularly. With the press forming, the corrugated part is provided to have a plurality of concavities at one face of the metal plate and convexities to the other face side formed by said concavities which are arranged in a peripheral direction. The corrugated cylinder part is provided by bending said corrugated part to be a cylindrical form with respect to the plate part and a ring-shaped tooth body made of synthetic resin is integrally molded on the exterior side of said corrugated cylinder part.

With this method of manufacturing the gear, relatively long concavities of said corrugated part can be formed with a relatively small presser since the corrugated part is provided by performing press forming on the outer peripheral side of the metal plate having the plate part on the center side circularly, that is to say since the corrugated part configured as a corrugated plate is provided on the outer peripheral side of the metal plate. Consequently the method ensures an enough contact area between the tooth body and the support body, and enhances uniting strength between the tooth body and the support body. In addition, the corrugated cylinder part having relatively long concavities is provided simply since the corrugated cylinder part is provided by bending the corrugated part configured as a corrugated plate with respect to the plate part. Consequently the support body is formed with a relatively small presser, and manufacturing costs of the support body and the gear having said support body can be reduced all the more.

The above and further objects and features of the invention will more fully be apparent from the following detailed description with accompanying drawings.

DETAILED DESCRIPTION OF THE INVENTION

The following description will explain the present invention in detail with reference to the drawings illustrating some embodiments thereof.

Figure 3:
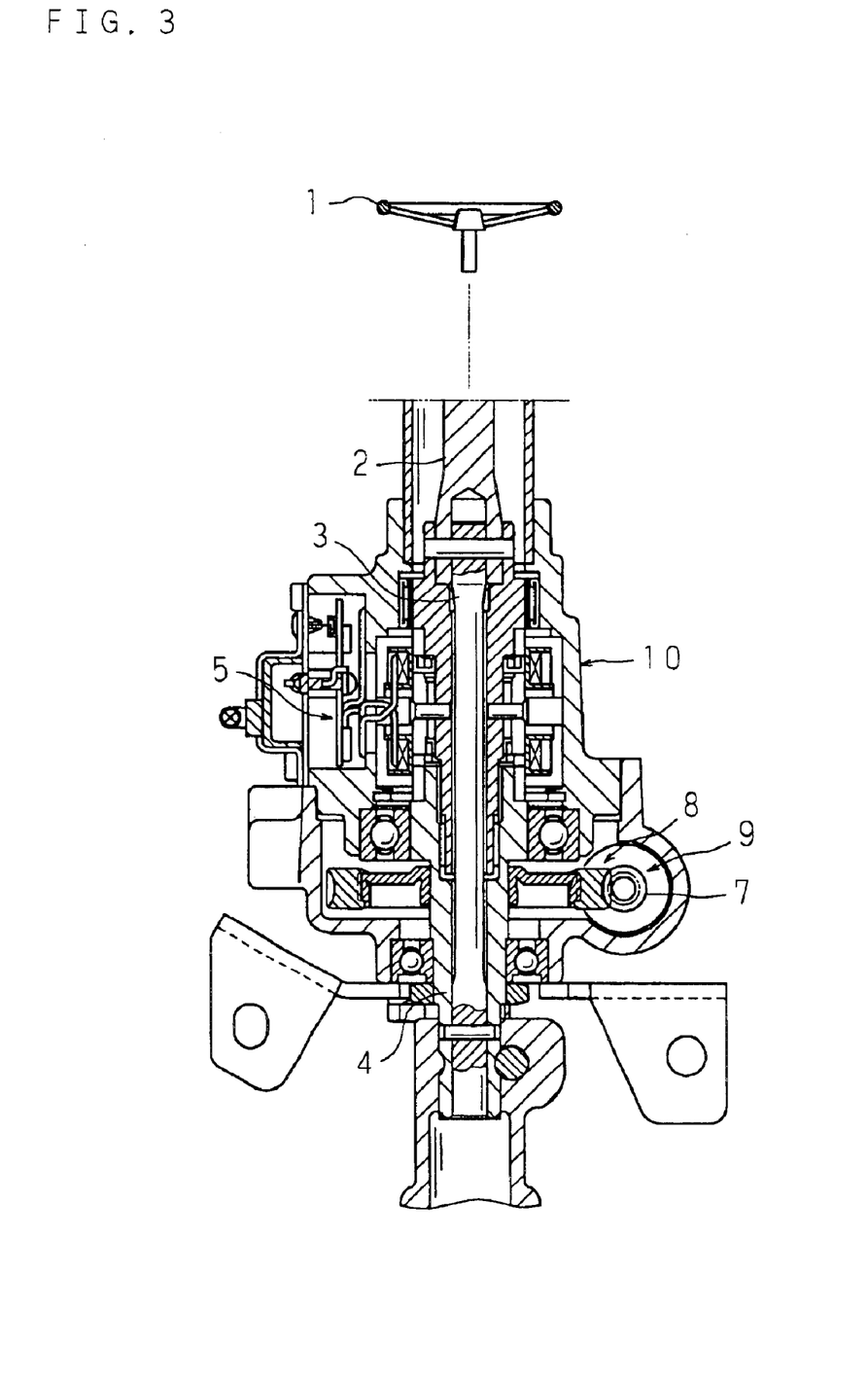
FIG. 3 is a cross-sectional view showing a constitution of an electric power steering apparatus according to the present invention.
Figure 4:
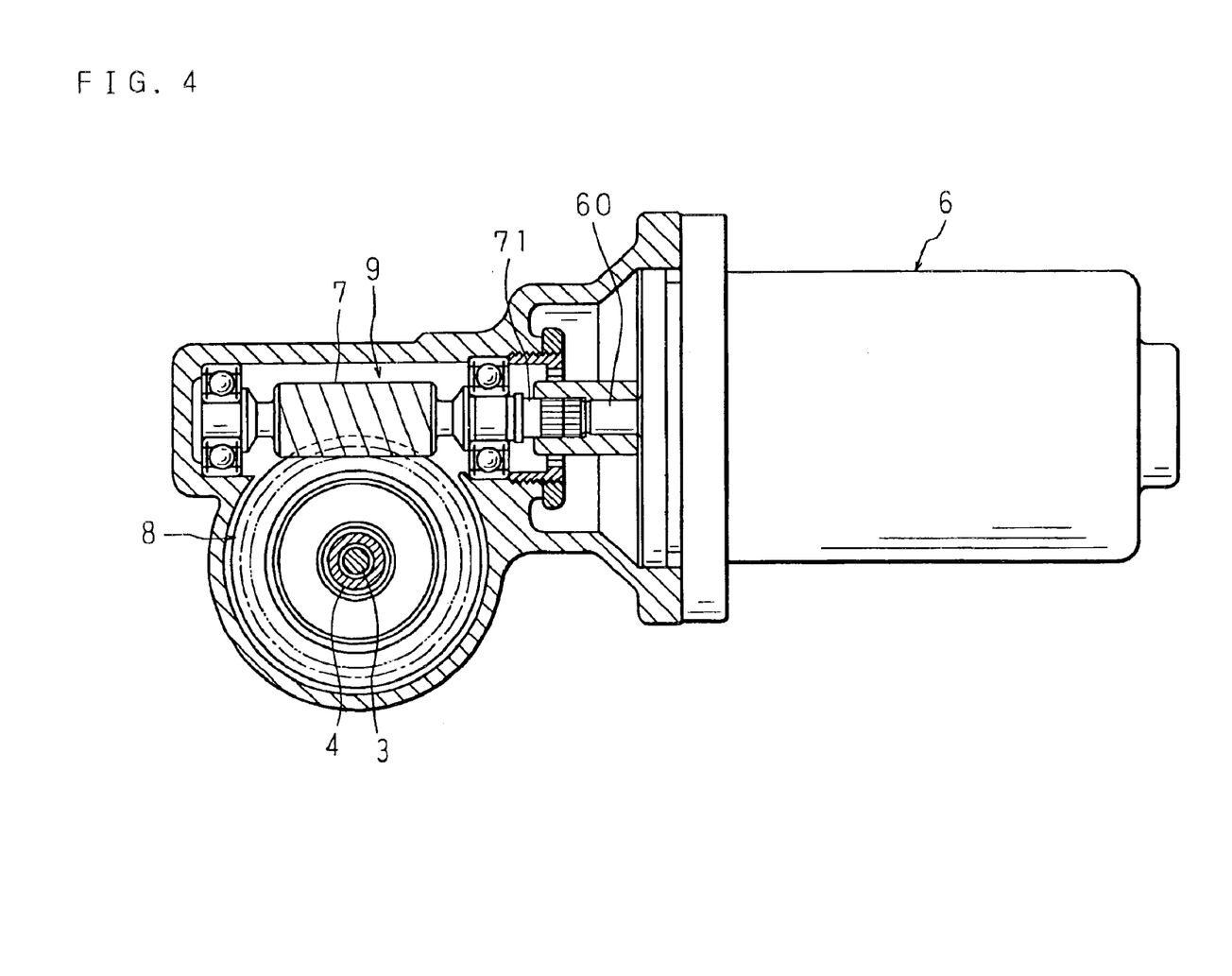
FIG. 4 is a cross-sectional view showing a constitution of a reduction mechanism and a motor part of the electric power steering apparatus according to the present invention.

FIG. 3 is a cross-sectional view showing a constitution of an electric power steering apparatus according to the present invention. FIG. 4 is a cross-sectional view showing a constitution of a reduction mechanism and a motor part.

The electric power steering apparatus comprises: a first steering shaft 2 which is joined at one end thereof to a steering wheel 1 for steering and has a cylinder part at the other end thereof; a torsion bar 3 which is insulted into the interior of the cylinder part and coaxially connected at one end thereof to the other end of the steering shaft 2, the torsion bar 3 being twisted by the action of a steering torque applied on the steering wheel 1; a second steering shaft 4 one end part of which is insulted to the peripheral of the cylinder part and the other end of which is coaxially connected to the other end of the torsion bar 3; a torque sensor 5 for detecting a steering torque applied on the steering wheel 1 based on a relative rotation displacement amount of the first and second steering shafts 2, 4 corresponding to the torsion of the torsion bar 3; a steering assist motor 6 to be driven based on a torque detected by said torque sensor 5; a reduction mechanism 9 interlocking with rotation of the motor 6, which has a driving gear (which is hereafter called a worm) 7 and a driven gear (which is hereafter called a worm wheel) 8 for reducing said rotation and transmitting the reduced rotation to the second steering shaft 4; and a housing 10 for accommodating the torque sensor 5 and the reduction mechanism 9.

The reduction mechanism 9 is arranged to intersect a shaft center of the second steering shaft 4. The reduction mechanism 9 comprises the worm 7 made of metal having a shaft part 71 joined to an output shaft 60 of the motor 6 and the worm wheel 8 meshing with said worm 7, which is engaged with and fitted to the middle of the second steering shaft 4. Rotation of the output shaft 60 is reduced by meshing of said worm 7 and worm wheel 8 and transmitted to the second steering shaft 4. The rotation is further transmitted from the second steering shaft 4 via a universal joint (not illustrated) to a steering mechanism (not illustrated) of rack-pinion type, for example.

Figure 5:
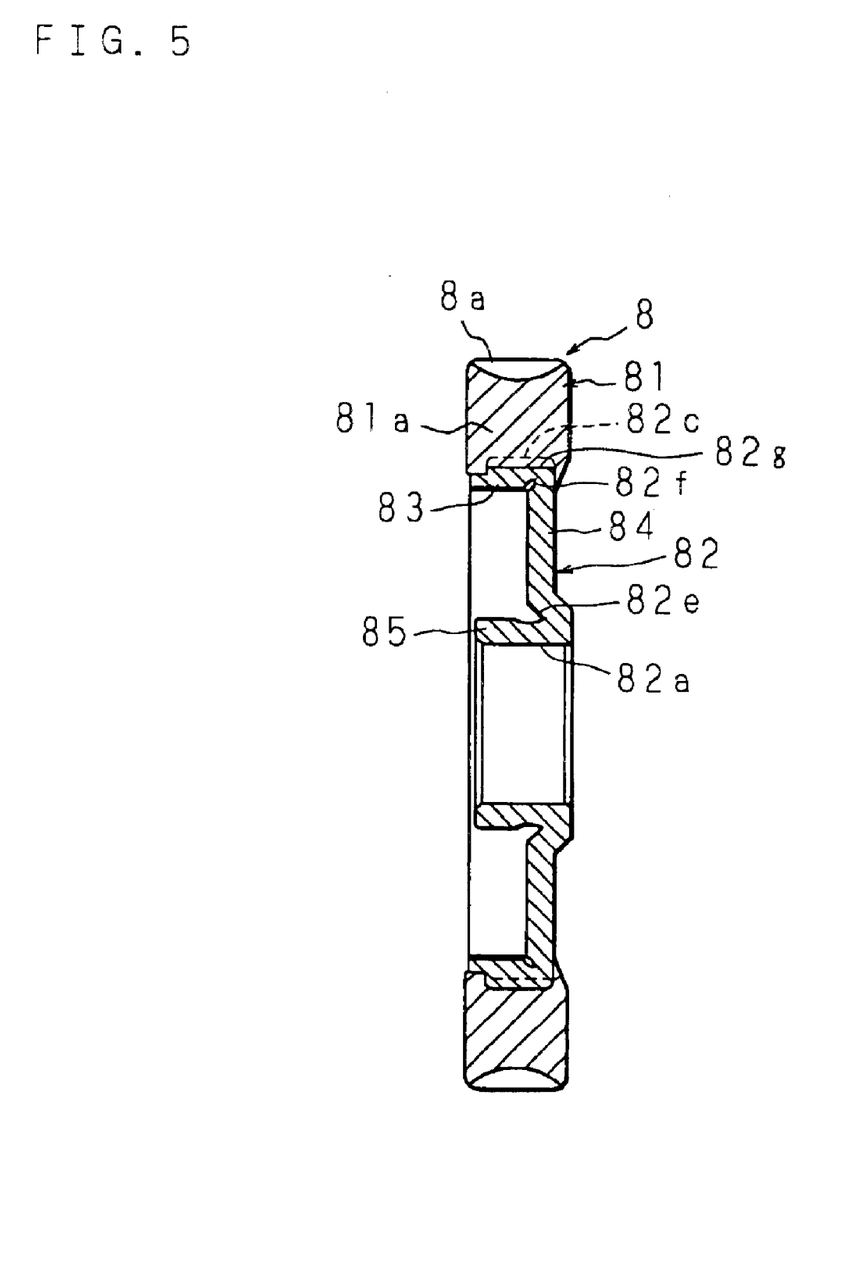
FIG. 5 is an enlarged cross-sectional view showing a constitution of a worm wheel of the electric power steering apparatus according to the present invention.

FIG. 5 is an enlarged cross-sectional view showing a constitution of a worm wheel.

The worm wheel 8 comprises a ring-shaped tooth body 81 made of synthetic resin having a plurality of teeth 8*a* meshing with the worm 7 and a support body 82 made of metal engaged with the interior side of said tooth body 81. A mounting hole 82*a* provided at a center part of said support body 82 is engaged with the second steering shaft 4. The tooth body 81 made of synthetic resin which is provided at the worm wheel 8 has advantages of reducing a jarring noise made by meshing with the worm 7 and heightening workability of the teeth 8*a*.

Figure 6:
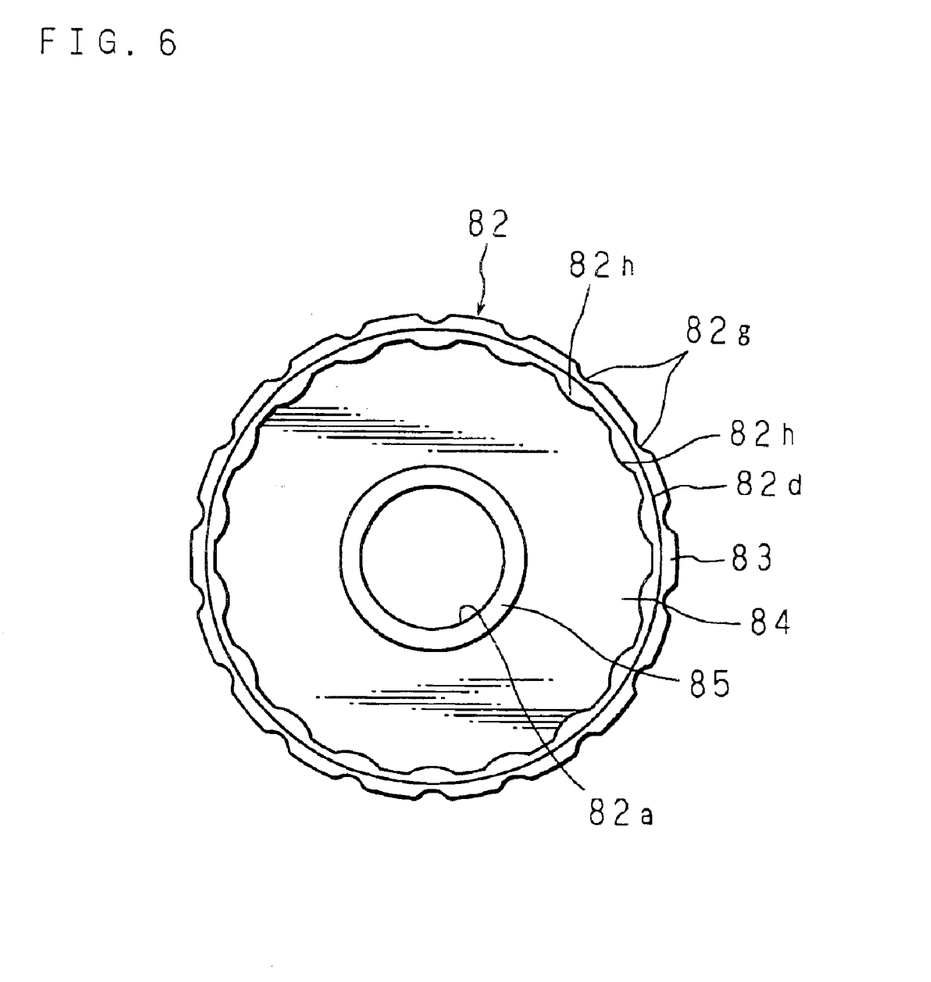
FIG. 6 is an enlarged side view showing a constitution of a support body of the electric power steering apparatus according to the present invention.
Figure 7:
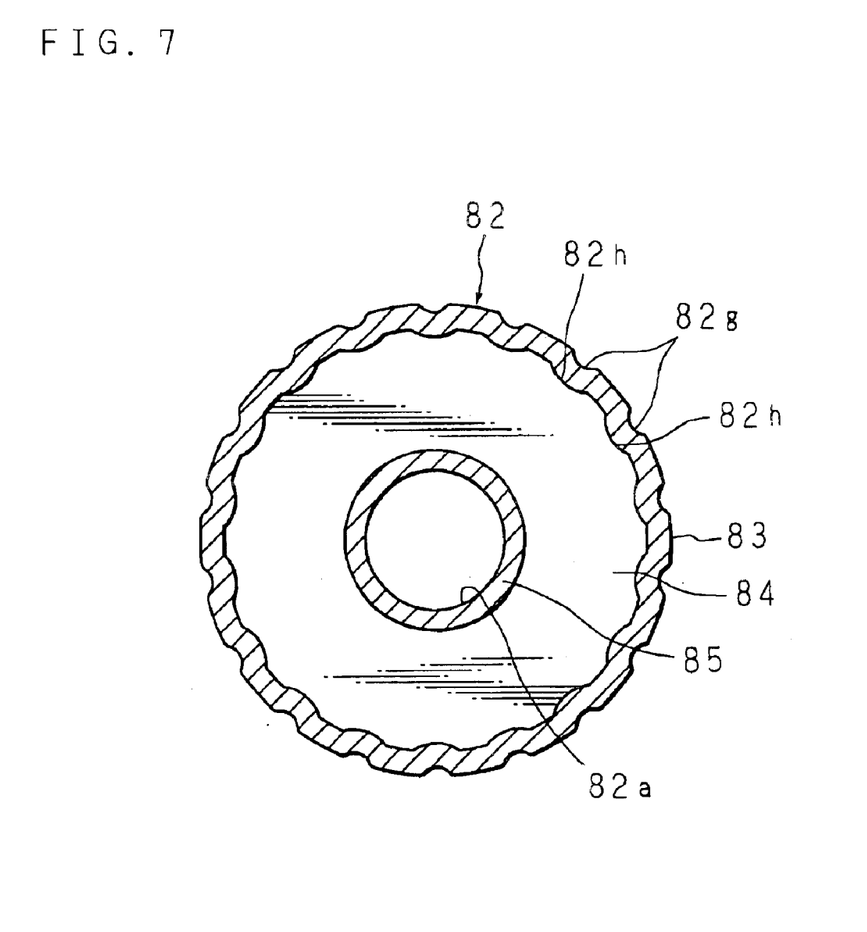
FIG. 7 is an enlarged cross-sectional view showing a constitution of the support body of the electric power steering apparatus according to the present invention.

FIG. 6 is an enlarged side view showing a constitution of a support body. FIG. 7 is an enlarged cross-sectional view showing a constitution of the support body.

The support body 82 comprises: a corrugated cylinder part 83 engaged with the tooth body 81; a disc plate part 84 an exterior edge of which is united with an end of said corrugated cylinder part 83; and a mounting cylinder part 85 which is bent at an interior edge of said plate part 84 to be concentric with the corrugated cylinder part 83.

Figure 8A:
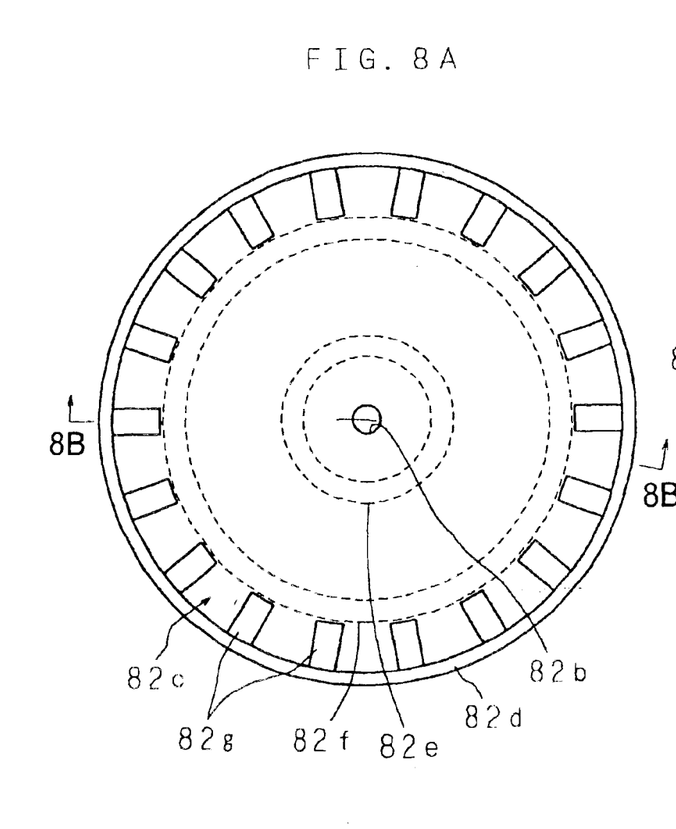
FIG. 8A is a plan view showing a manufacturing process of the support body of the electric power steering apparatus according to the present invention.
Figure 8B:
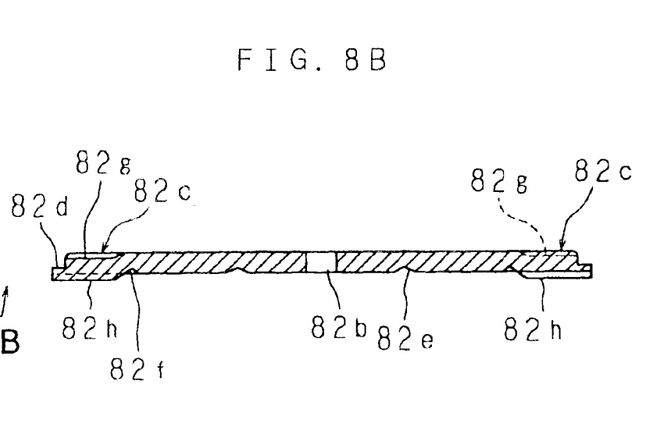
FIG. 8B is a cross-sectional view showing a manufacturing process of the support body, the view being taken on the plane of the line 8B—8B of FIG. 8A.
Figure 9A:
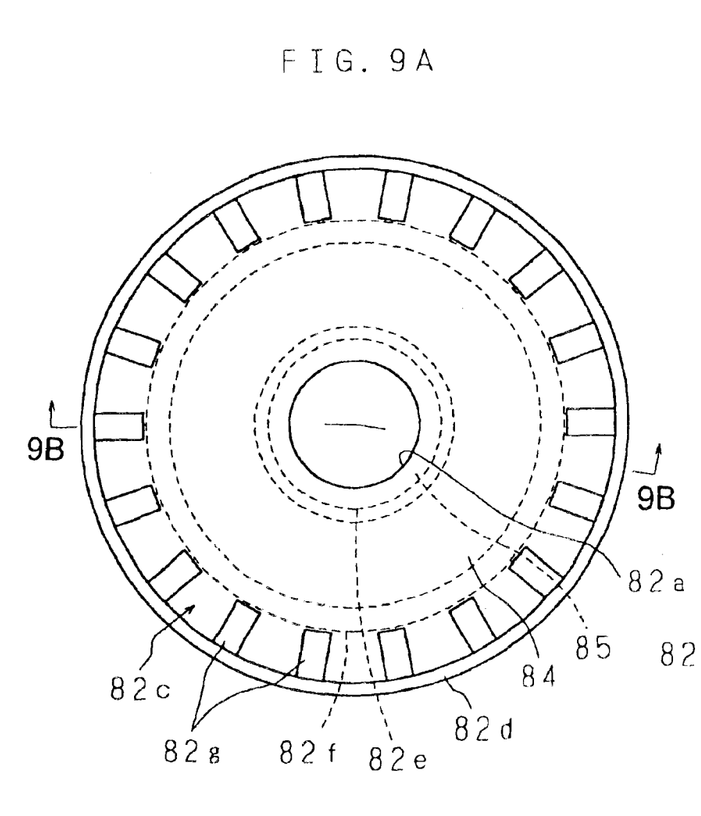
FIG. 9A is a plan view showing a manufacturing process of the support body of the electric power steering apparatus according to the present invention.
Figure 9B:
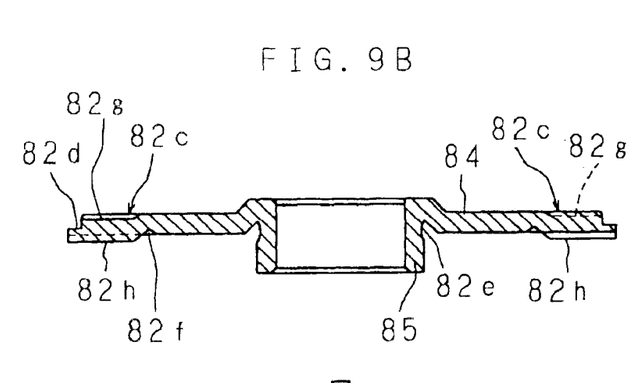
FIG. 9B is a cross-sectional view showing a manufacturing process of the support body, the view being taken on the plane of the line 9B—9B of FIG. 9A.
Figure 9C:
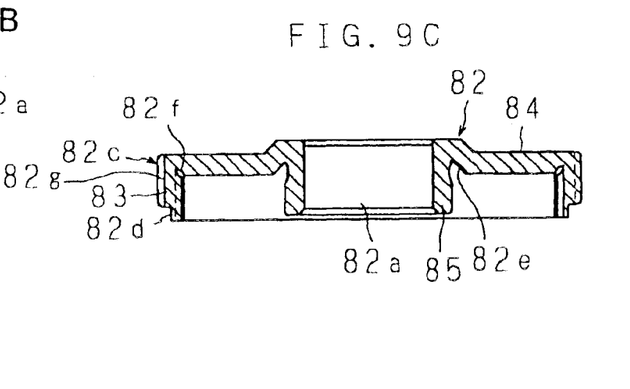
FIG. 9C is a cross-sectional view of a completely formed support body of the electric power steering apparatus according to the present invention.

FIG. 8A is a plan view showing a manufacturing process of the support body of the electric power steering apparatus according to the present invention; FIG. 8B is a cross-sectional view showing a manufacturing process of the support body, the view being taken on the plane of the line 8B—8B of FIG. 8A; FIG. 9A is a plan view showing a manufacturing process of the support body of the electric power steering apparatus according to the present invention; FIG. 9B is a cross-sectional view showing a manufacturing process of the support body, the view being taken on the plane of the line 9B—9B of FIG. 9A; and FIG. 9C is a cross-sectional view of the completely formed support body of the electric power steering apparatus according to the present invention.

The support body 82 is manufactured as follows. A through hole 82*b* is provided at a center part of a metal plate by performing press forming on said metal plate circularly. In the next place, a ring corrugated part 82*c* deformed to corrugate in a plate thickness direction and a ring concavity part 82*d* are provided by press forming respectively on an outer peripheral side and from said corrugated part 82*c* to an exterior edge. Further, a first and a second ring grooves 82*f*, 82*e* are provided spaced by press forming at the other face between the through hole 82*b* and corrugated part 82*c* (see FIG. 8A and FIG. 8B).

Plastic deformation is performed on concavities 82*g* forming concavely on one face of the metal plate in a peripheral direction and convexities 82*h* forming on the other face by said concavities 82*g* to be a corrugated plate. The corrugated part 82*c* is thus formed (see FIG. 8B). Though the figure shows eighteen concavities 82*g* and convexities 82*h* with 20 degrees therebetween, the number of the concavities 82*g* and convexities 82*h* is not limited to the specific number.

The mounting cylinder part 85 and plate part 84 are formed by performing press forming on a center side from the second ring groove 82*e* of the intermediate product press-formed as described above (see FIG. 9A and FIG. 9B). In the next place, the corrugated cylinder part 83 is formed by bending an outer edge side from the first ring groove 82*f* of the intermediate product to be a cylindrical form with respect to the plate part 84 (see FIG. 9C). At the time of forming described above, press forming can be performed with high accuracy without generating a spring back since the mounting cylinder part 85 and corrugated cylinder part 83 are bent at the ring groove parts 82*e*, 82*f*.

Since the corrugated part 82*c* is configured as a corrugated plate by performing press forming on the outer peripheral side of the metal plate circularly, relatively long concavities 82*g* of the corrugated part 82*c* can be formed with a relatively small presser. Consequently an enough contact area can be ensured between the tooth body 81 and the support body 82, and uniting strength between the tooth body 81 and the support body 82 is enhanced.

The corrugated cylinder part 83 having relatively long concavities can be provided simply by bending the corrugated part 82*c* configured as a corrugated plate with respect to the plate part 84. Consequently the support body 82 can be formed with a relatively small presser, and a cost of the support body 82 is reduced all the more.

In addition, unnecessary deposit on the support body 82 can be removed satisfactorily in comparison with a conventional support body formed through cut processing and cold forging and resin can be deposited uniformly since the engagement part of the support body 82 with the tooth body 81 is configured as the press-formed corrugated cylinder part 83. Further, costs are reduced all the more since the structure of the engagement part can be simplified all the more.

The tooth body 81 comprises the teeth 8*a* and a ring part 81*a* which supports said teeth 8*a*. An interior side of said ring part 81*a* is engaged with and retained at the corrugated cylinder part 83. The tooth body 81 is molded by setting the support body 82 as an insert accommodated in a mold for injection molding and injecting melted synthetic resin such as nylon resin from an end part of the corrugated cylinder part 83 to an outer side peripheral and the ring concavity part 82*d*. The tooth body 81 is thus integrally united with the support body 82. With this constitution, synthetic resin for molding the tooth body can appropriately circulate along the concavities 82g on the exterior side of the corrugated cylinder part 83 since the tooth body 81 is united with the exterior side of the corrugated cylinder part 83. Consequently the tooth body 81 is united with the corrugated cylinder part 83 without generating voids and weld marks.

In molding the tooth body 81, the synthetic resin is filled from one end part of the corrugated cylinder part 83 to the concavities 82g and the ring concavity part 82d. Filled synthetic resin prevents relative movement both in a peripheral direction and in an axial direction of the tooth body 81 and the support body 82.

In the electric power steering apparatus constituted as described above, rotation of the steering assist motor 6 is transmitted from the worm 7 via the tooth body 81 meshing with said worm 7 and the worm wheel 8 having the support body 82 engaged with the interior side of said tooth body 81 to the second steering shaft 4.

The above explanation of the embodiment is on the support body 82 having the mounting cylinder part 85 which is provided at an inner edge of the plate part 84 to be concentric with the corrugated cylinder part 83. However, the reduction mechanism 9 may be constituted without the mounting cylinder part 85 so that the plate part 84 is mounted to the steering shaft 4.

In addition, the reduction mechanism 9 of the embodiment mentioned above may be a hypoid gear comprising a driving gear configured as a hypoid pinion and a driven gear configured as a hypoid wheel in place of the worm gear comprising the driving gear 7 configured as a worm and the driven gear 8 configured as a worm wheel. Further, the reduction mechanism 9 may be configured as a bevel gear.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A method of manufacturing a gear to be attached to a transmitting shaft for transmitting rotation of a steering assist motor to a steering mechanism, comprising steps of:
   providing a corrugated part by performing press forming on an outer peripheral side of a metal plate having a plate part on a center side to have a plurality of concavities at one face thereof and convexities to the other face side formed by said concavities which are arranged in a peripheral direction;
   providing a corrugated cylinder part by bending said corrugated part into a cylindrical form with respect to the plate part; and
   integrally molding a ring-shaped tooth body made of synthetic resin on an exterior side of said corrugated cylinder part.

2. The method of manufacturing the gear according to claim 1, wherein the corrugated cylinder part is bent at a first ring groove part which is provided at an edge of the plate part.

3. The method of manufacturing the gear according to claim 2,
   further comprising a step of forming a mounting cylinder part by performing press forming on a center side of the metal plate,
   wherein the mounting cylinder part is bent at a second ring groove part which is provided at an interior edge of the plate part.

4. The method of manufacturing the gear according to claim 3,
   further comprising a step of providing a ring concavity part from the corrugated part to an exterior edge,
   wherein the tooth body is molded by filling synthetic resin from one end part of the corrugated cylinder part to an exterior side peripheral and the ring concavity part.

* * * * *